US008321041B2

(12) United States Patent (10) Patent No.: US 8,321,041 B2
Jellison, Jr. et al. (45) Date of Patent: Nov. 27, 2012

(54) PLAYLIST-BASED CONTENT ASSEMBLY

(75) Inventors: David C. Jellison, Jr., Ogallala, NE (US); Shawn Coffman, Ogallala, NE (US); Dustin Bond, Kearney, NE (US)

(73) Assignee: Clear Channel Management Services, Inc., San Antonio, TX (US)

( * ) Notice: Subject to any disclaimer, the term of this patent is extended or adjusted under 35 U.S.C. 154(b) by 873 days.

(21) Appl. No.: 11/415,868

(22) Filed: May 2, 2006

(65) Prior Publication Data

US 2006/0268667 A1 Nov. 30, 2006

Related U.S. Application Data

(60) Provisional application No. 60/676,909, filed on May 2, 2005.

(51) Int. Cl.
*G06F 17/00* (2006.01)
(52) U.S. Cl. ............. 700/94; 381/80; 381/81; 369/47.1; 369/47.15; 369/47.23
(58) Field of Classification Search .................. 700/94
See application file for complete search history.

(56) References Cited

U.S. PATENT DOCUMENTS

| | | | | |
|---|---|---|---|---|
| 5,467,288 A | * | 11/1995 | Fasciano et al. | 715/716 |
| 5,479,518 A | * | 12/1995 | Zampini | 381/119 |
| 5,902,947 A | * | 5/1999 | Burton et al. | 84/477 R |
| 6,016,380 A | * | 1/2000 | Norton | 386/52 |
| 6,201,924 B1 | * | 3/2001 | Crane et al. | 386/52 |
| 6,489,969 B1 | * | 12/2002 | Garmon et al. | 715/723 |
| 6,573,907 B1 | * | 6/2003 | Madrane | 715/719 |
| 6,792,615 B1 | * | 9/2004 | Rowe et al. | 725/37 |
| 6,871,003 B1 | * | 3/2005 | Phillips et al. | 386/55 |
| 7,073,127 B2 | * | 7/2006 | Zhao et al. | 715/719 |
| 7,203,758 B2 | * | 4/2007 | Cook et al. | 709/231 |
| 7,219,308 B2 | * | 5/2007 | Novak et al. | 715/768 |
| 7,493,289 B2 | * | 2/2009 | Verosub et al. | 705/51 |
| 7,518,053 B1 | * | 4/2009 | Jochelson et al. | 84/609 |
| 7,521,623 B2 | * | 4/2009 | Bowen | 84/612 |
| 7,623,755 B2 | * | 11/2009 | Kuspa | 386/55 |
| 2002/0023103 A1 | * | 2/2002 | Gagne | 707/501.1 |
| 2002/0053078 A1 | * | 5/2002 | Holtz et al. | 725/14 |
| 2002/0092019 A1 | * | 7/2002 | Marcus | 725/37 |
| 2002/0136531 A1 | * | 9/2002 | Harradine et al. | 386/69 |
| 2002/0159752 A1 | * | 10/2002 | David | 386/52 |
| 2002/0189427 A1 | * | 12/2002 | Pachet | 84/609 |
| 2003/0084441 A1 | * | 5/2003 | Hunt | 725/32 |

(Continued)

FOREIGN PATENT DOCUMENTS

WO  WO 2005/069621 A1 * 7/2005

OTHER PUBLICATIONS

Id3_metadata: ID3v2 draft specification; copyright Feb. 3, 1999.*

*Primary Examiner* — Paul McCord
(74) *Attorney, Agent, or Firm* — Garlick & Markison; Edward J. Marshall

(57) ABSTRACT

A method of and apparatus for content assembly is provided by which an automation playlist of media events is created, a relationship is defined between the media events, the media events are merged into a composite media event and published.

17 Claims, 19 Drawing Sheets

U.S. PATENT DOCUMENTS

| | | | |
|---|---|---|---|
| 2003/0138235 A1* | 7/2003 | Tanaka | 386/69 |
| 2003/0151618 A1* | 8/2003 | Johnson et al. | 345/716 |
| 2004/0177096 A1* | 9/2004 | Eyal et al. | 707/104.1 |
| 2004/0199657 A1* | 10/2004 | Eyal et al. | 709/231 |
| 2004/0218902 A1* | 11/2004 | Yanagita | 386/52 |
| 2004/0252593 A1* | 12/2004 | Kudo | 369/30.08 |
| 2004/0253945 A1* | 12/2004 | Janik | 455/419 |
| 2005/0025320 A1* | 2/2005 | Barry | 381/119 |
| 2006/0129907 A1* | 6/2006 | Volk et al. | 715/500 |
| 2006/0130117 A1* | 6/2006 | Lee et al. | 725/135 |
| 2006/0204220 A1* | 9/2006 | Lee | 386/95 |
| 2006/0212478 A1* | 9/2006 | Plastina et al. | 707/104.1 |
| 2006/0224940 A1* | 10/2006 | Lee | 715/500.1 |
| 2006/0238835 A1* | 10/2006 | Nishida et al. | 358/537 |
| 2006/0248209 A1* | 11/2006 | Chiu et al. | 709/231 |
| 2006/0265421 A1* | 11/2006 | Ranasinghe et al. | 707/104.1 |
| 2007/0028275 A1* | 2/2007 | Lawrie | 725/93 |
| 2007/0123185 A1* | 5/2007 | Welk et al. | 455/166.2 |

* cited by examiner

© 2005-2006 Prophet Systems Innovation

© 2005-2006 Prophet Systems Innovation

© 2005-2006 Prophet Systems Innovation

PLAYLIST-BASED CONTENT ASSEMBLY

PRIORITY CLAIM

This application claims the benefit of priority to U.S. Provisional Patent Application Ser. No. 60/676,909 filed May 2, 2005, entitled "Content Assembler" by the same inventors.

COPYRIGHT NOTICE

This application contains material that is subject to copyright protection. Such material may be reproduced by any person exactly as it appears in the Patent and Trademark Office patent files or records. The copyright owner otherwise reserves all rights to such material.

FIELD

This application relates generally to a method and apparatus for assembling and publishing media content, and particularly to automated podcast creation.

BACKGROUND

"Podcasting" generally refers to the distribution of assembled content over a network such as the Internet using web syndication for listening on mobile devices and personal computers. Such content may include, for example, audio and video files and other media events, and may be published, for example, over the Internet using, for example, RSS or Atom (web syndication formats). The term "podcast" may generally refer to both the assembled content and the method of delivery. Podcasts are typically distributed by subscription feed to automatically deliver new content.

Currently, multitrack media editors, such as Propoganda from Mixmeister Technology, are used to manually assemble, sequence, and edit content. Alternatively, some podcasters use real-time recording techniques to assemble content by, for example, electronically playing content from a device and/or creating content by voice, recording that content with a microphone in the desired assembly, and then re-digitizing the content. There exists, therefore, a need for a more automated approach to content assembly.

DETAILED DESCRIPTION

In one embodiment, podcast automation is described in connection with radio station broadcast automation software. Those skilled in the art will appreciate that podcast automation may alternatively be provided in connection with television station broadcast automation software or other broadcast automation software. Those skilled in the art will further appreciate that the content assembly process and apparatus described herein may be used to create and publish a podcast, but is not limited to that purpose. For example, media assembled according to the process described herein may be copied to CD or other media, or may be stored in a media database for later retrieval.

Figure 1:
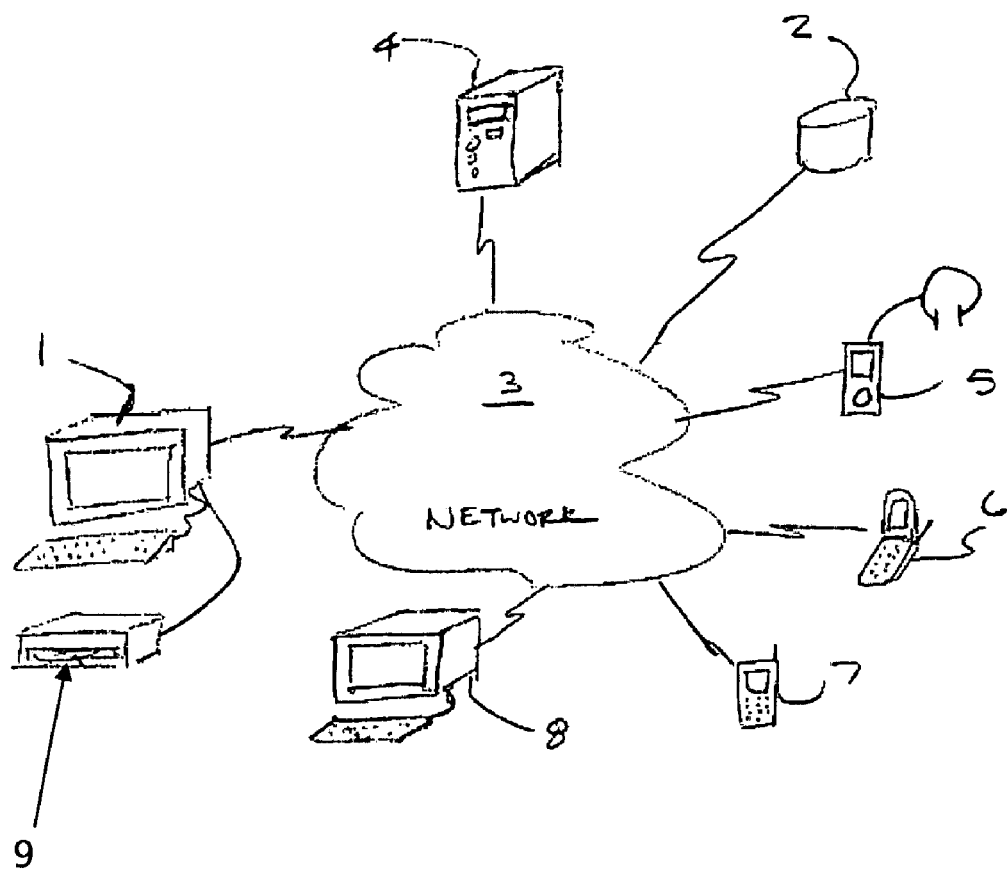
FIG. 1 depicts an embodiment of a system that may be used for assembling and publishing content in connection with broadcast automation software.

As seen in the embodiment of FIG. 1, podcast automation may be provided in connection with radio broadcast automation software, such as the NexGen Digital™ broadcast automation software suite from Prophet Systems Innovations, installed on a computer 1 located at a radio broadcasting station. In this embodiment, the computer 1 includes a monitor, a keyboard, a mouse, an Intel® Celeron® 1 GHz processor, 128 Mb of memory, a DirectX-compatible sound card, a Microsoft® Windows®-compatible sound card, DirectX version 8.1 and runs Microsoft® Windows® 2000/XP. Those skilled in the art will appreciate that other computer configurations may be used. Computer 1 may also contain sufficient storage for maintaining a local database of content in the form of various media events, or may be connected to a remote database 2 of media event content. In the radio broadcasting context, such content may comprise a plurality of media events such as songs, advertisement spots, radio host commentary, news, segues, beds, promos, station identification, traffic reports, time and temperature announcements, sound effects, shows, and the like, and may include metadata associated with those media events, such as artist, title, track and the like. Those skilled in the art will appreciate that media events in other contexts, such as in assembling video and text files, may include video elements, text and other visual events, as well.

Additionally, for publication of assembled media events in the form of, for example, a podcast, a connection to the network 3 or other communication or data transfer network, such as the Internet, may be used to, for example, upload a podcast to an FTP server 4 for downloading to a personal electronic device such as an iPOD 5, mobile phone 6, PDA 7 or personal computer 8. Alternatively, the assembled content may be stored on portable media, such as on a CD 9 or flash drive (not shown), for publication, or stored in the local database of computer 1 or in the remote database 2.

Figure 2:
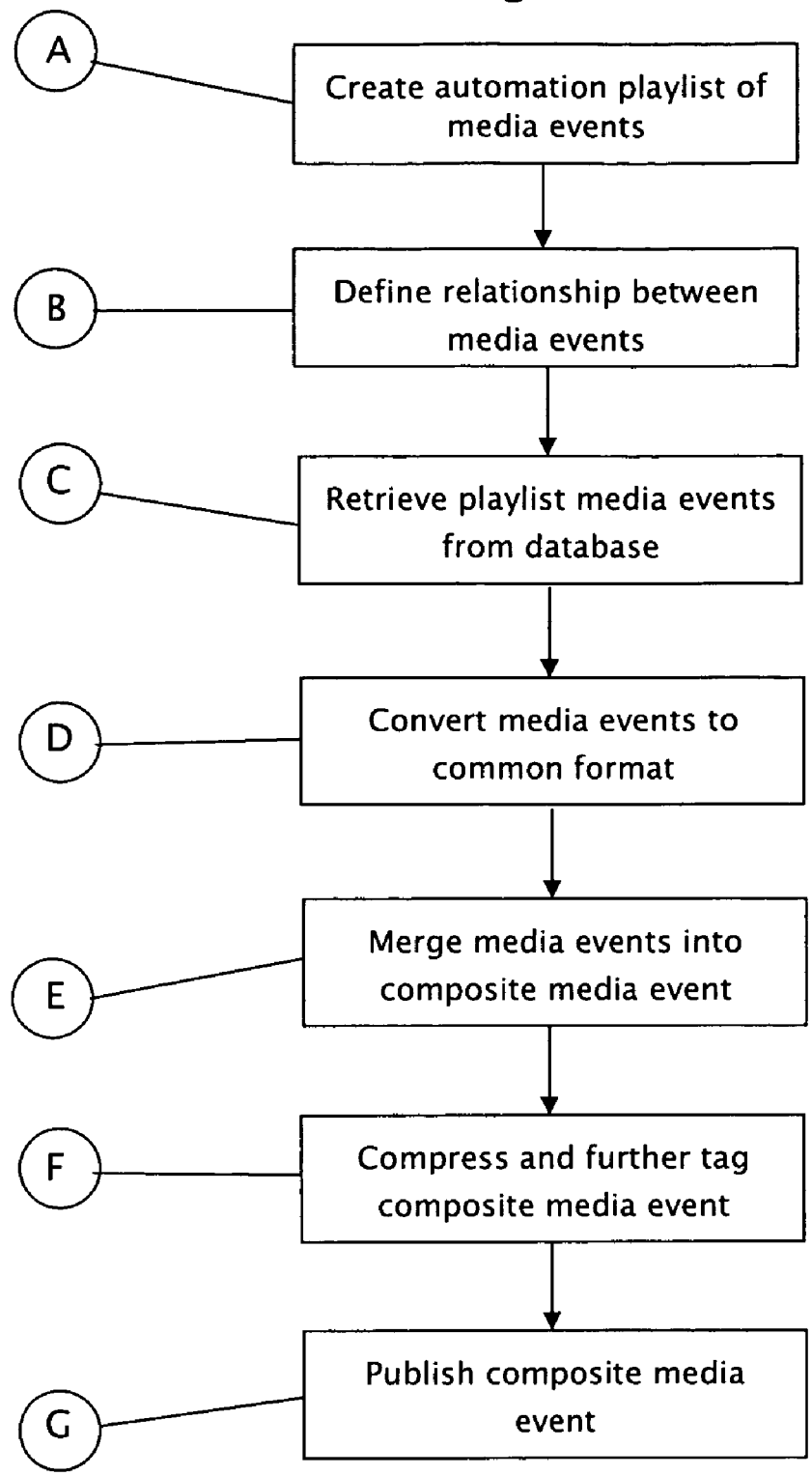
FIG. 2 is a flowchart of one embodiment of a method for assembling content in a system of FIG. 1.

As may be seen in FIG. 2, the podcast automation process may include various steps, some or all of which may be utilized. As will become clear below, those steps do not necessarily have to be performed in the order depicted. The steps depicted in FIG. 2 are discussed in more detail below in connection with discussion of the content assembly process.

Figure 3:
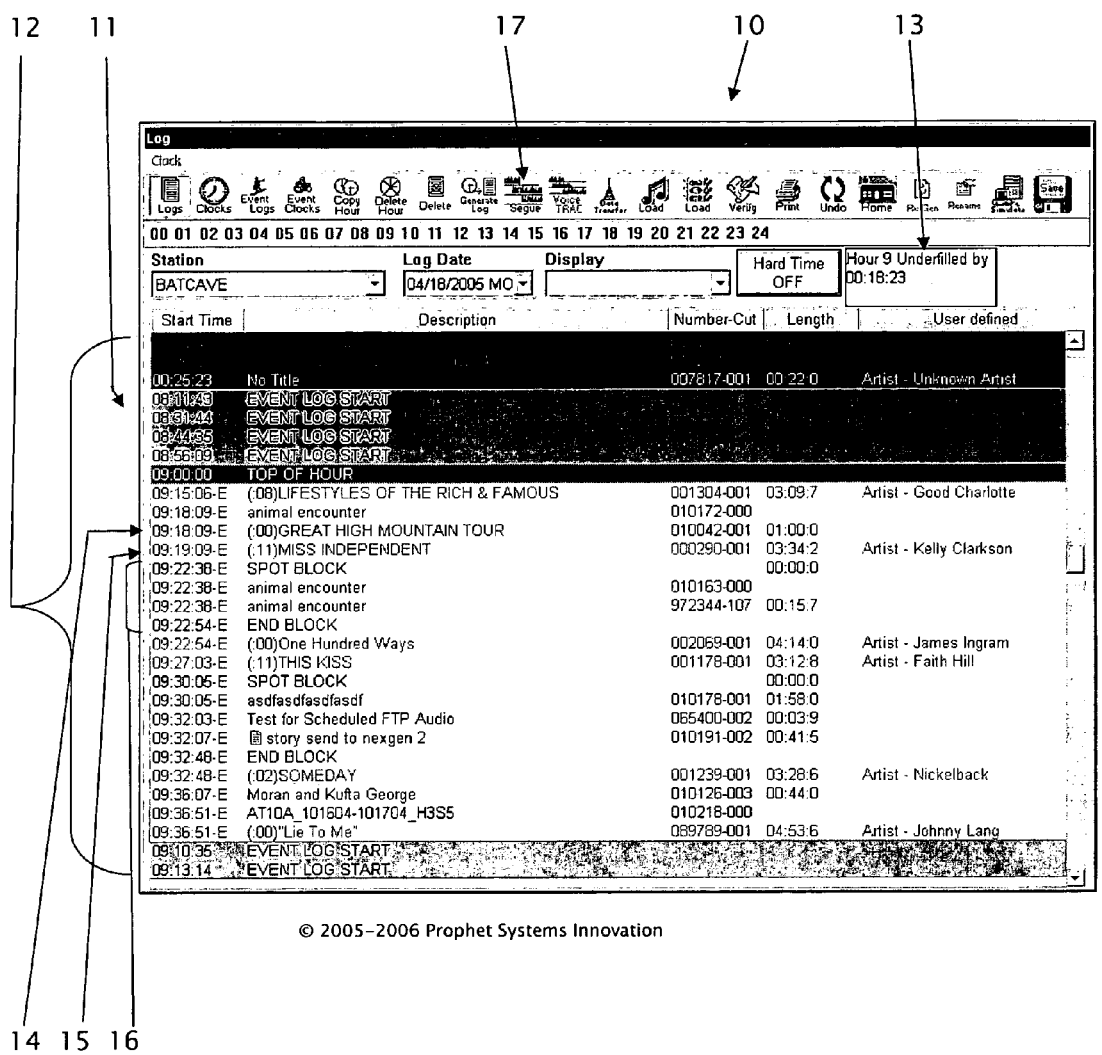
FIG. 3 depicts an embodiment of an event log of media events that may be provided by the exemplary broadcast automation software.

As seen in the embodiment of FIG. 3, the exemplary broadcast automation software allows a broadcast station to automate the production of a radio program through creation of a media event log 10, corresponding to step A of FIG. 2. In the event log interface 10, a broadcaster may define, over a 24-hour period, when various media events 11 will be played to create the radio (or television, etc., as the case may be) broadcast "experience," as is known to those skilled in the art. The event log 12 is thus generally a time-based collection of media events 11 arranged in playback order, and may include metadata associated with the media events 11, such as song title, artist, radio station identification, macros (user-defined sequences of media events) and the like. Other time periods may be used, of course, and an event log 12 may be planned and created well in advance of actual broadcast. The event log 12 may, for example, indicate to the broadcaster whether airtime 13 has been adequately filled. In the embodiment of FIG. 3, the event log provides a list of media events arranged according to the time during which each media event will play. For example, a one-minute long "Great High Mountain Tour" spot 14, or advertisement, is shown as scheduled to play at 9:18:09, followed by the song "Miss Independent" 15 by artist Kelly Clarkson, which is shown as scheduled to play at 9:19:09. Also, for example, an "animal and counter" spot block 16, or advertisement, is scheduled to begin play at 9:22:38, and end at 9:22:54. In this embodiment, the event log sets out an exemplary morning show radio program that includes advertisement spots and songs.

To create the "radio experience," the exemplary broadcast automation software may provide a segue editor that the broadcaster may use to define the relationship between media events 11, as in step B of FIG. 2. In the embodiment of FIG. 3, the event log interface 10 provides a button 17 by which a broadcaster may access the segue editor. In any case, those skilled in the art will appreciate that the log interface 10 and event log 12 format are exemplary, and that other broadcast automation software may provide a different interface and format.

Figure 4:
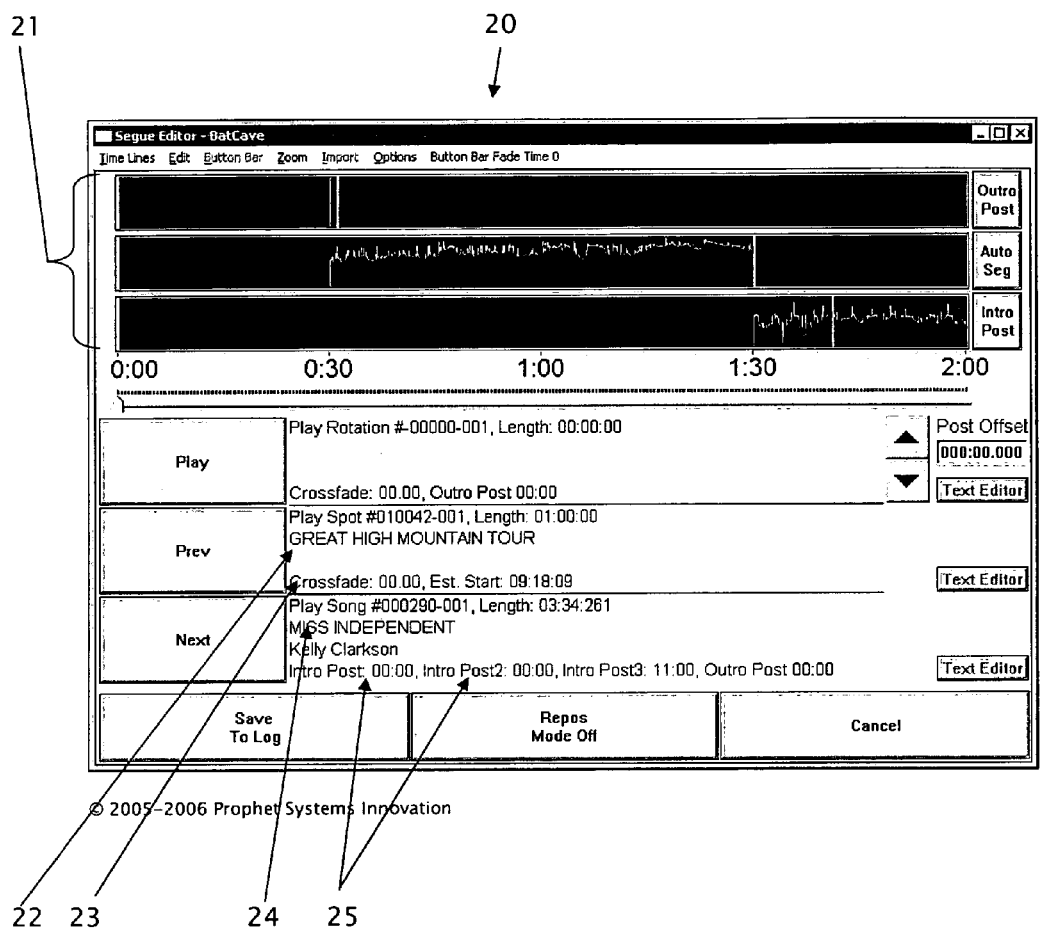
FIG. 4 depicts an embodiment of an editor that may be provided by the exemplary broadcast automation software that may be used to define the relationship between the media events of FIG. 3.

FIG. 4 depicts an embodiment of a segue editor 20 that may be provided by the exemplary broadcasting automation software. The segue editor 20 may, for example, illustrate the time sequence of media events by providing a waveform display 21 for visual indication of the transition between media events. The segue editor may also allow for various transitional relationships, such as crossfades, overlap, clipping, and fade in and fade out relationships to be defined, and may provide markers or other data to associate with the media events for indicating such relationships. In the audio context, for example, "fading" generally refers to the process of changing the volume of an media event over time. "Fade in" and "fade out" may thus generally refer to increasing and decreasing, respectively, the volume of a media event over time, and "cross fading" generally refers to simultaneously fading out the end of one media event, while fading in the beginning of the next media event. For example, the end of one song may fade out while the intro to the next song may fade in. "Fading" is commonly done at the beginning and end of a media event, but may be accomplished during other portions of a media event, as well. Those skilled in the art will appreciate that in a video context, a similar relationship may be defined between video elements, e.g., a video element may fade to black, or may fade into a subsequent video element. "Volume transitions" may be used in the same manner as fading to allow for adjustments of volume within a media event during playback. Also, "clipping" generally refers to the process of excluding a portion of a media event during playback, such as the beginning or end of a song or video element. "Overlap" generally refers to simultaneous performance of media events. In the embodiment of FIG. 4, for example, the "Great High Mountain Tour" spot 22 is depicted as a beginning without any crossfade 23, and the "Miss Independent" song 24 following that spot is provided with intros 25.

Figure 5:
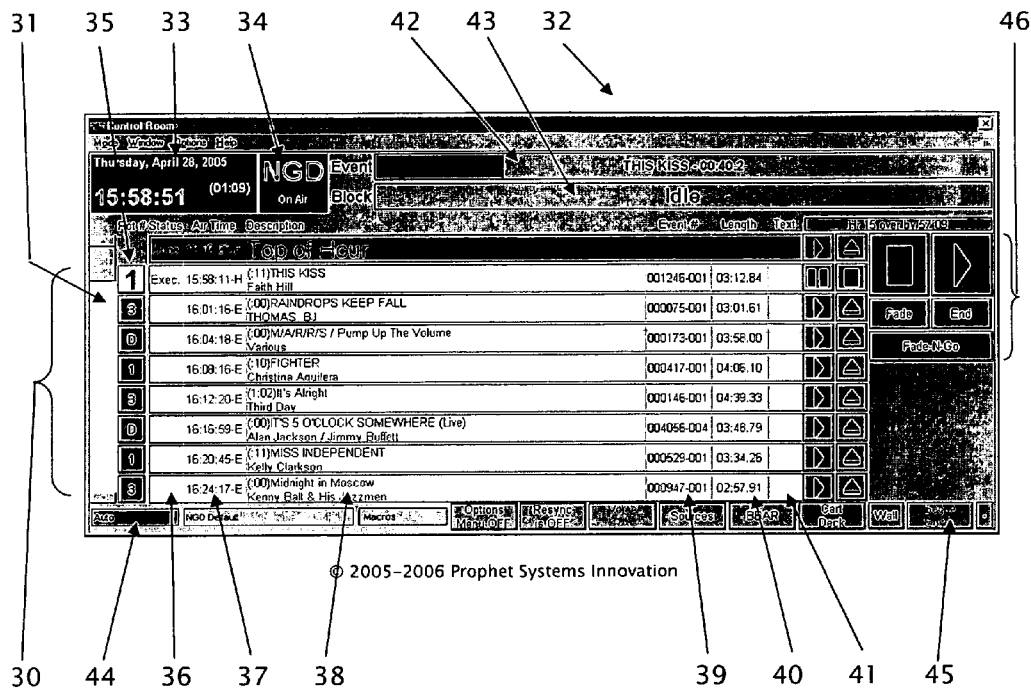
FIG. 5 depicts an embodiment of a playlist of media events that may be provided by the exemplary broadcast automation software.

As is known to those skilled in the art, a playlist, such as that depicted in the embodiment of FIG. 5, may be generated from an event log, and may indicate playback of the media events listed in the event log. In this context, "playback" generally refers to performing a media event or plurality of media events in real-time. In this embodiment, the playlist 30 provides a plurality of media events 31 that may be used to create a radio broadcast. As seen in FIG. 5, to assist in creation and control of a playlist, the "control room" 32 of the exemplary broadcast automation software of this embodiment provides the current date and time and the time remaining until the top of the hour 33, the station being monitored 34, the control board 35 through which the media event will play, the status 36 of each media event (either blank (not playing), Exec (playing) or Done (executed)), the "air time" length 37 of each media event (showing an E if the time is estimated, or an H if it is a specific start time), a description 38 for each media event, each media event's unique identification number 39, the length 40 of the media event in minutes, seconds and tenths of a second, and any notes 41 associated with the media event. In this embodiment, the "control room" also includes an events progress bar 42 to show the progress of the currently playing media events song, and a block progress bar 43 to show the progress of the currently playing media events spot block, if one is playing. Those skilled in the art will appreciate that the "control room" interface 32 and playlist 30 format is exemplary, and that other broadcast automation software having different playlist and media event formats may be utilized.

The "control room" interface 32 of FIG. 5 further includes various status indicators and operating options related to playback of the playlist. At the lower edge of the screen, for example, the status indicator 44 in "AUTO" mode indicates that the broadcast is being done automatically without manual intervention. Alternatively, the broadcast mode may allow for "live assist" intervention if a human operator is present. The "Segue Editor" button 45, for example, allows the relationship or transition between media event to be defined to provide a particular listening experience, as described above in connection with FIG. 4. That is, step B of FIG. 2 may be performed at this point, as well, or the alternative. In a typical radio broadcast, as noted above, one media event may fade into the next media event, or media events may partially or wholly overlap. In using a radio broadcast program as a podcast, for example, it is desired to retain the relationship between media events.

Of course, a broadcaster may also define a transition or otherwise alter the listening experience "on the fly" by using the "Fade," "End" and "Fade-N-Go" buttons 46 depicted in the "control room" interface 32 of FIG. 5.

Figure 6:
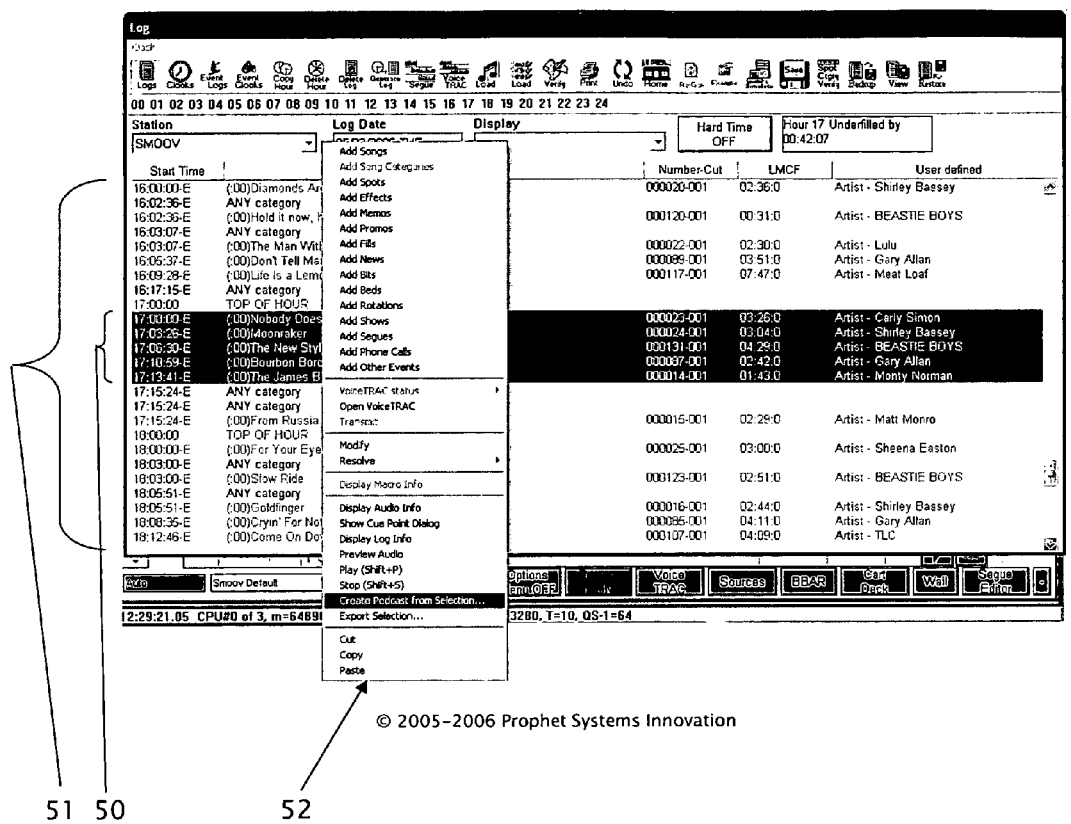
FIG. 6 depicts a selection of media events from the media event log of FIG. 3 for assembly.

It may be desired to publish a portion of the radio program as a podcast. In this embodiment, and as seen in FIG. 6, the desired portion 50 of the radio program may be selected from the event log 51. As seen in FIG. 6, the broadcast automation software allows for selection of a series of media events for publication as a podcast. In FIG. 6, the highlighted portion 50 of the event log begins at 17:00:00 and ends at 17:13:41, and encompasses five songs. Those skilled in the art will appreciate that a plurality of portions may be selected. For example, it may be desired to select a portion of the event log, and deselect certain media events, such as local advertisements, or otherwise select only certain portions of the event log.

Figure 7:
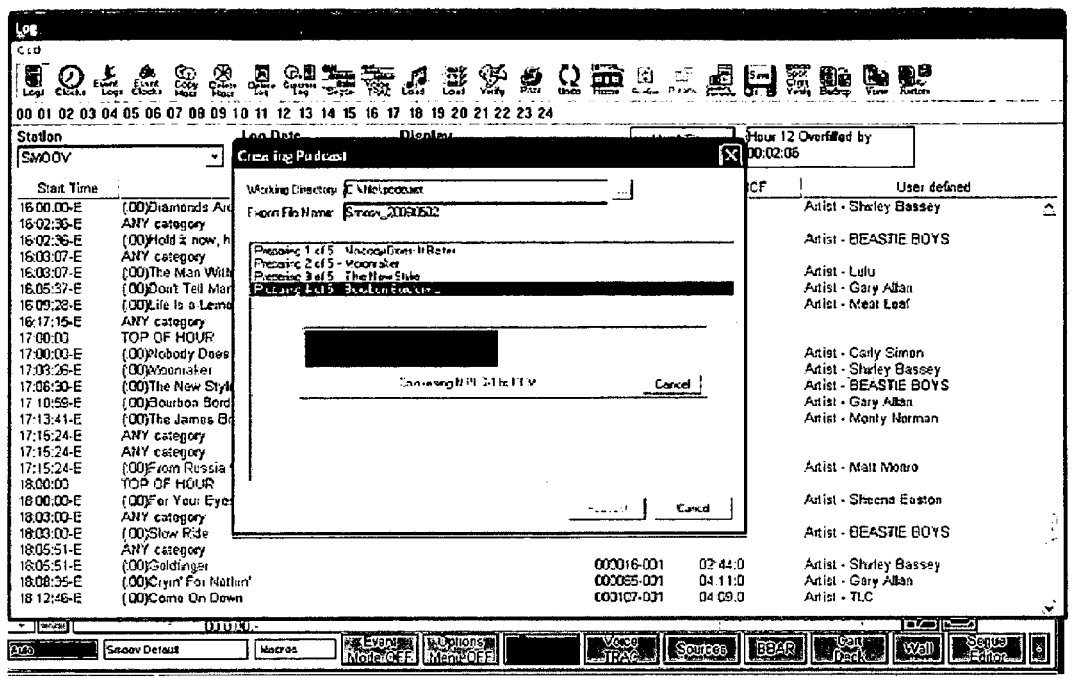
FIG. 7 depicts conversion of the selected media events of FIG. 6 to a common file format.

In the embodiment of FIG. 6, to automatically create podcast, one may select a "Create Podcast from Selection" option from a menu 52. In this embodiment, the media events selected from the event log 51 are converted to a podcast, as described in more detail below. Upon selecting the podcasting option from the menu, the media events captured in the event log selection 50 each may be retrieved from a media event database, as in step C of FIG. 2, along with metadata (such as the transitional relationship between media events) associated with each media event, uncompressed, if compressed, and converted from their native formats, if necessary, and converted to a common file format, as in step D of FIG. 2. In this embodiment, for example, the media events stored at the remote database 2 of FIG. 1 in MPEG-1 Layer 2 format may be retrieved and converted to the PCM (.wav) file format as is known in the art, as depicted in the embodiment of FIG. 7. Upon conversion, the media events may be locally saved in the common file format along with associated metadata.

Figure 8:
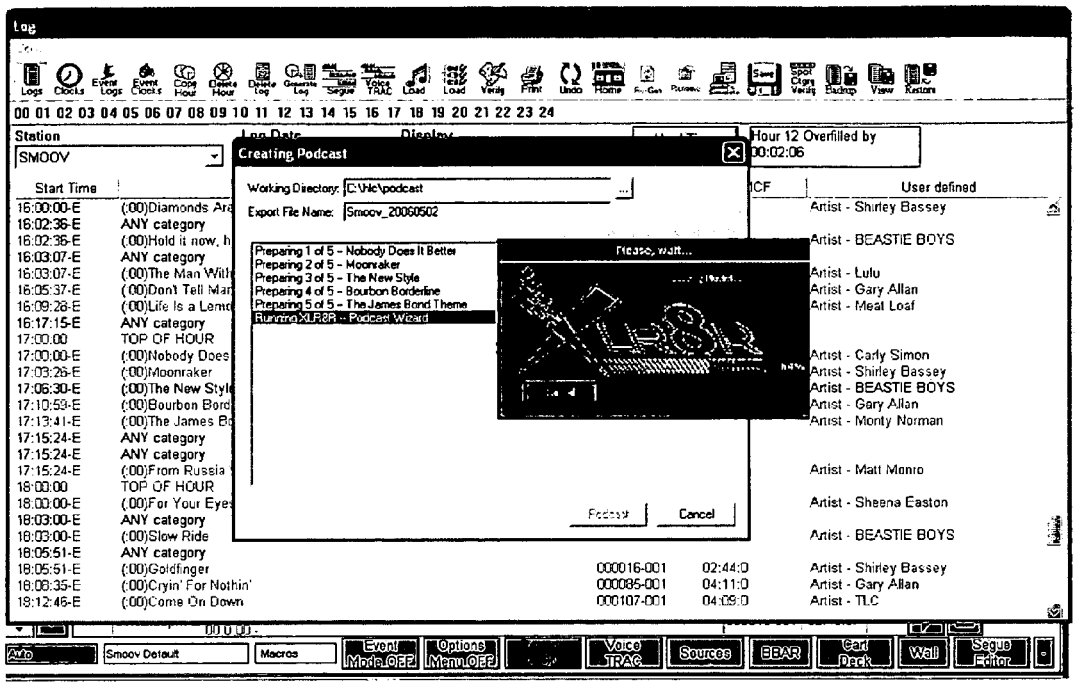
FIG. 8 depicts launching a podcast automation interface that may be provided by the exemplary broadcast automation software.

Once the media events have been converted into and saved in a common file format, the broadcast automation software may launch a process, as seen in the embodiment of FIG. 8, that may allow the broadcaster to define and publish the podcast. Generally, that process may be comprised of four steps, namely, (1) defining an RSS channel, (2) defining an RSS item, (3) providing MP3 or other media property tags and (4) publishing the podcast.

Figure 9:
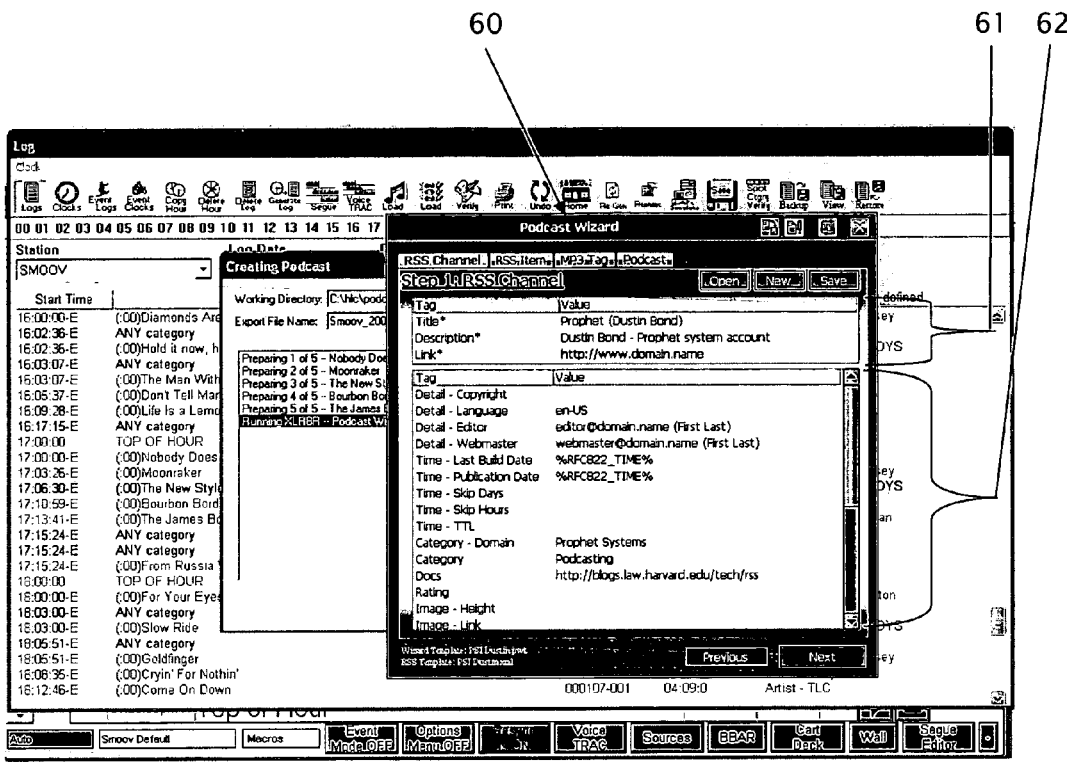
FIG. 9 depicts one embodiment of an interface for defining an RSS channel that may be provided by the exemplary broadcast automation software.

As seen in the embodiment of FIG. 9, the broadcaster may define the RSS channel for podcast publication over the Internet. In this embodiment, a user interface 60 is provided to allow the broadcaster to easily define XML tags, such as podcast title, description, and URL 61. Many other XML tags 62 may be defined, as well, such as copyright information, language, editor, publication date, and various associated documents, to name a few examples. Generally, the RSS channel may be defined once, and once the RSS channel is defined, a user may simply add, delete or modify RSS items in that channel thereafter.

Figure 10:
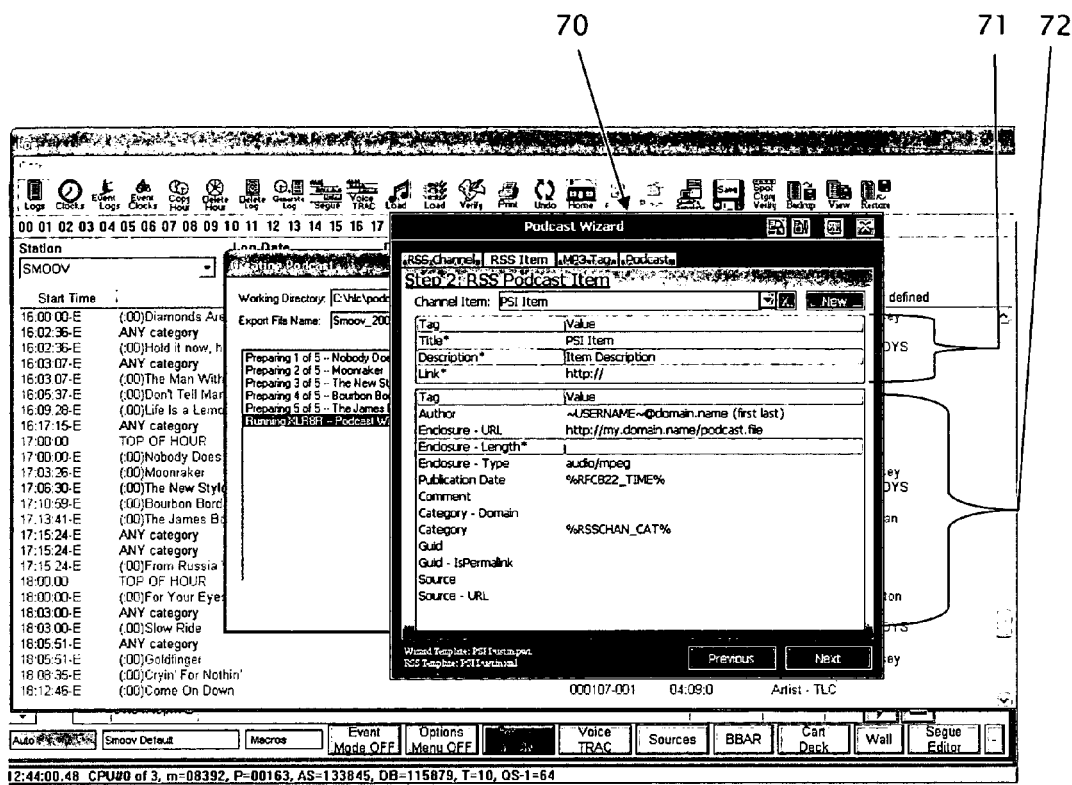
FIG. 10 depicts one embodiment of an interface for defining an RSS item that may be provided by the exemplary broadcast automation software.

As seen in the embodiment of FIG. 10, the next step is to define the RSS item or podcast. In general terms, an RSS item is the summary of the content delivered through the RSS channel. As shown in the interface 70 FIG. 10, a user may define the podcast title and description 71, as well as author, publication date, source and the like 72. Generally, the XML tags associated with the RSS item serves to define the podcast at the FTP or web site for subscribers. For example, the XML tags may be interpreted for display on an HTML web page to provide the foregoing information.

Figure 11:
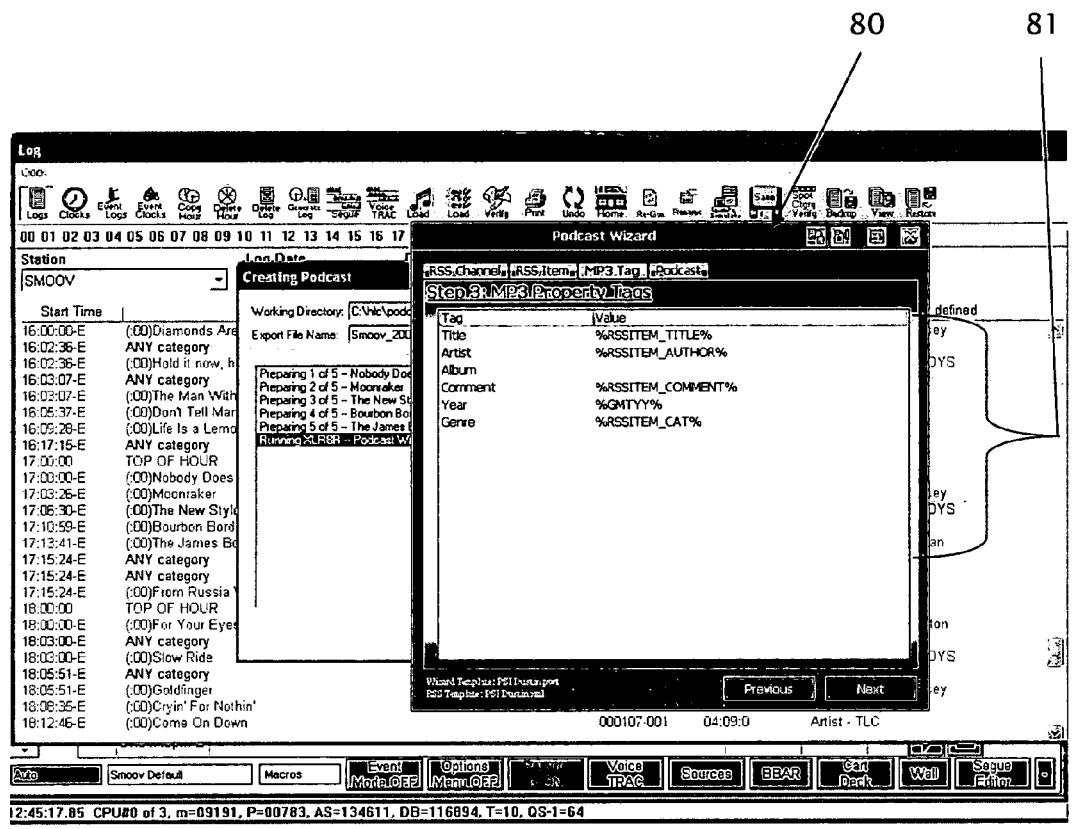
FIG. 11 depicts one embodiment of an interface for defining MP3 property tags that may be provided by the exemplary broadcast automation software.

As seen in the embodiment of FIG. 11, the broadcaster may also provide an interface 80 to allow a user to define MP3 or other media property tags 81 to accompany the podcast. Such tags may be, for example, idv1 and idv2 MP3 tags. Those skilled in the art will appreciate that other types of tags may accompany other media formats. For example, if a user downloaded the podcast to an iPOD, the information contained in the MP3 property tags may be displayed on the iPOD's screen. Such information may include title, artist, album and the like information to accompany the podcast.

Figure 12:
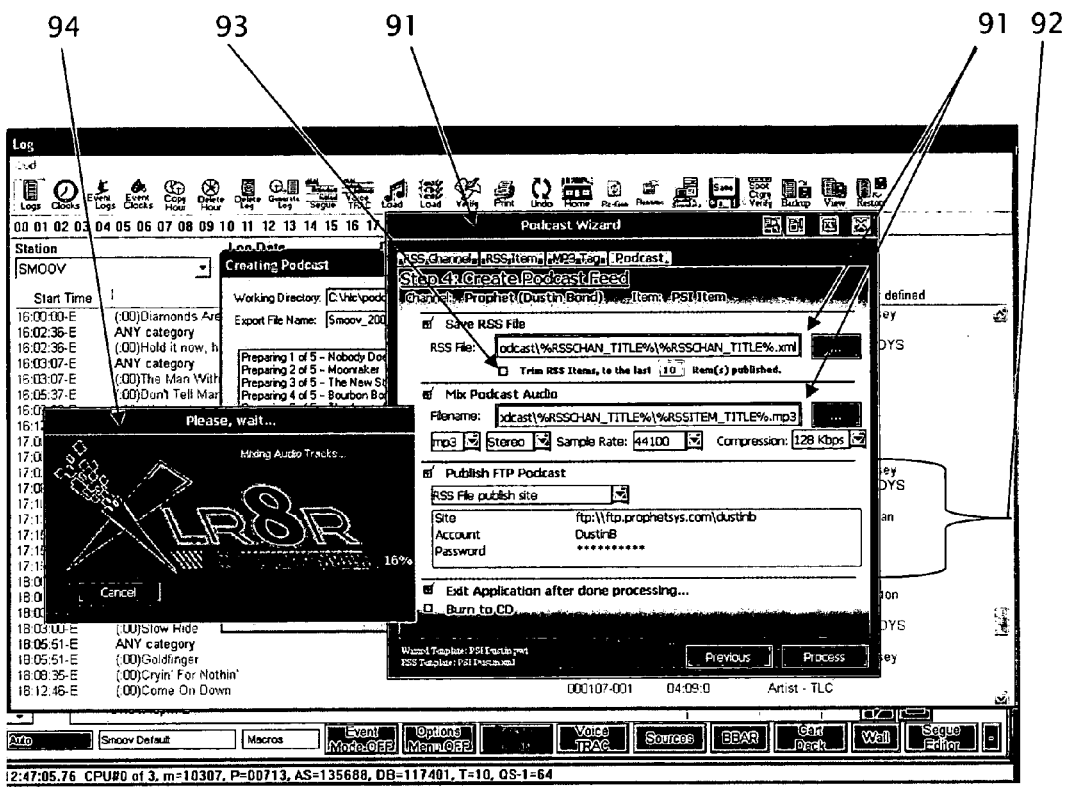
FIG. 12 depicts one embodiment of an interface for defining a podcast feed that may be provided by the exemplary broadcast automation software, and further depicts mixing of the media events of FIG. 7 into a composite media file.

As seen in the embodiment of FIG. 12, a broadcaster may define the podcast feed. In this embodiment, the podcast feed interface 90 may be used to create or update a local copy of the RSS or web feed, as well as publish and save changes. In this embodiment, the interface provides the options 91 of publishing or saving the RSS and podcast files to different locations. If, for example, the files are to be published to the same location, only the "FTP Publish Podcast" section 92 need be completed. Also, the interface provides an option 93 to trim RSS items to, for example, the last 10 items published.

In this embodiment, the podcasting automation interface provides a list of defined variables to be used in defining the podcast. Those variables may include the following:

| Date and Time Substitution Variables: | |
|---|---|
| %MM% | 2 Digit |
| %DD% | 2 Digit |
| %YY% | 4 Digit |
| %HR% | 2 Digit |
| %MIN% | 2 Digit |
| %SEC% | 2 Digit |
| %DATE% | MM-DD-YYYY |
| %TIME12% | HH:MM:SS |
| %TIME24% | HH:MM:SS |
| %RFC822_TIME% | DAY, DD MMM YYYY HH:MM:SS GMT |
| %INT64_TIME% | INT64 Time stamp, 100-nanosecond intervals since Jan. 1, 1601 (like filetime) |
| %GMTMM% | 2 Digit |
| %GMTDD% | 2 Digit |
| %GMTYY% | 4 Digit |
| %GMTHR% | 2 Digit |
| %GMTMIN% | 2 Digit |
| %GMTSEC% | 2 Digit |
| %GMTPOS% | GMT LOCAL POSITION OFFSET + or − hrs_min −XX_XX or XX_XX) hrs |
| %GMTFILENAME | FULL GMT UNIQUE PATH STAMP see DEF_GMT_TIMESTAMP above |

| RSS Open File Variables | |
|---|---|
| %RSS_FULLPATH% | Retrieves the current data load RSS File, full path |
| %RSS_PATHONLY% | Retrieves the current data load RSS File, path only no file |
| %RSS_FILENAME% | Retrieves the current data load RSS File, filename only NO EXTENSION . . . |

| RSS Channel Page Control Variables | |
|---|---|
| %RSSCHAN_TITLE% | Retrieves the current data in the channels title control |

| RSS Channel Page Control Variables | |
|---|---|
| %RSSCHAN_DESC% | Retrieves the current data in the channels description control |
| %RSSCHAN_LINK% | Retrieves the current data in the channels link control |
| %RSSCHAN_CAT% | Retrieves the current data in the channels category control |
| %RSSCHAN_EDITOR% | Retrieves the current data in the channels editor control |
| %RSSCHAN_WEBM% | Retrieves the current data in the channels webmaster control |

| RSS Item Page Control Variables | |
|---|---|
| %RSSITEM_TITLE | Retrieves the current data in the item title control |
| %RSSITEM_DESC% | Retrieves the current data in the item description control |
| %RSSITEM_LINK% | Retrieves the current data in the item link control |
| %RSSITEM_CAT% | Retrieves the current data in the item category control |
| %RSSITEM_AUTHOR% | Retrieves the current data in the item author control |
| %RSSITEM_COMMENT% | Retrieves the current data in the item comment control |
| %RSSITEM_FILENAME% | Retrieves the enclosure filename in the item enclosure URL, with extension |

| MP3 Page Control Variables | |
|---|---|
| %MP3_TITLE% | Retrieves the current data in the MP3 title control |
| %MP3_ARTIST% | Retrieves the current data in the MP3 artist control |
| %MP3_ALBUM% | Retrieves the current data in the MP3 album control |
| %MP3_COMMENT% | Retrieves the current data in the MP3 comment control |
| %MP3_YEAR% | Retrieves the current data in the MP3 year control |
| %MP3_GENRE% | Retrieves the current data in the MP3 genre control |

| Podcast Page Control Variables | |
|---|---|
| %PODCAST_RSSFILE% | Retrieves the RSS Filename in the Save as RSS File control, filename only NO EXTENSION ... |
| %PODCAST_AUDIONAME% | Retrieves the Audio Filename in the RSS Mix Audio control, filename only NO EXTENSION ... |
| %PODCAST_AUTIOTYPE% | Retrieves the Audio filename type or extension in the RSS Mix Audio control. Audio file extension ... |

Once the podcast has been defined and tagged, the media events selected from the event log may then be merged 94 into a single composite media file using the transitional information contained in the metadata, as is also depicted in FIG. 12, and as corresponding to step E of FIG. 2. Merger may be accomplished by beginning with the chronologically first media event, appending the subsequent media event, and modifying the media events to reflect the relationship established between the two. Subsequent media events may be appended in like manner. Thus, the composite media file may provide the desired listening experience, e.g., the composite audio file may reflect a particular radio broadcast that includes any relationship, such as overlap, cross fading and timing established between media events. In other words, the radio program provided as a podcast will sound exactly as it would if broadcast over the air. In this way, a podcast may be created much more quickly than may be accomplished through capturing real-time playback of the media events via microphone.

Figure 13:
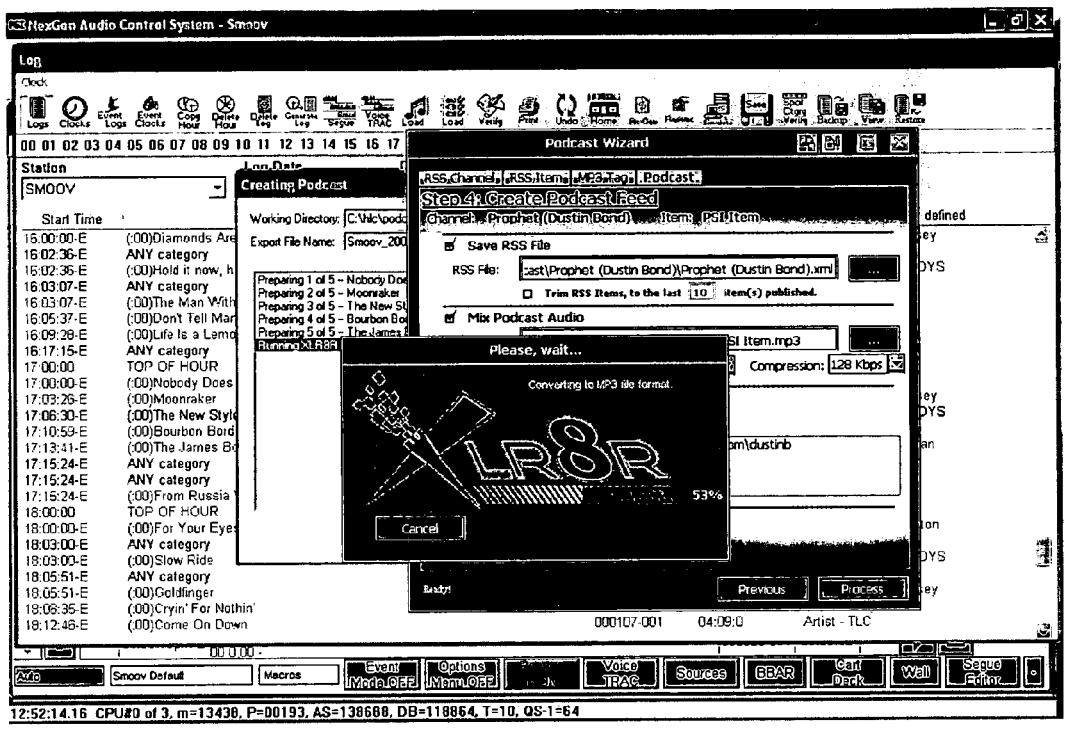
FIG. 13 depicts conversion of the composite media file of FIG. 12 to a compressed format.

Following merger, the composite audio file may be converted to a file format suitable for publication and playback, such as the MP3 file format, as seen in the embodiment of FIG. 13, and as corresponds to step F of FIG. 2. In this embodiment, the broadcast automation software may convert the PCM (.wav) audio file back to an MP3 file format. Alternatively, conversion may be accomplished at the same time as merger. Appropriate MP3 tags, as described above in the MP3 property tagging process, may then be added to allow metadata such as the title, artist, album, track number, etc., to be stored in the MP3 file. Those skilled in the art will appreciate that other file formats, such as AAC, WMA and Ogg Vorbis, may be used, along with tags applicable to those formats.

Figure 14:
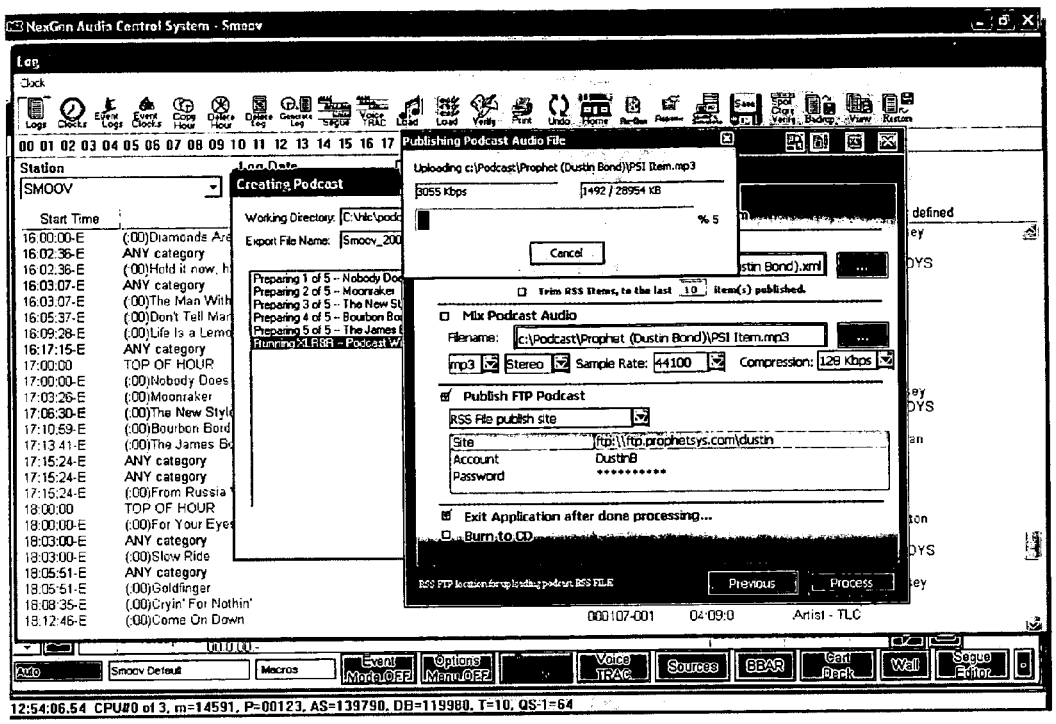
FIG. 14 depicts uploading the converted composite media file of FIG. 13 to an FTP server.

Finally, the podcast may be published by uploading to an FTP server as shown in FIG. 14, and as in step G of FIG. 2, for download to a personal electronic device, such as an iPod, as described above in connection with FIG. 1. Once the podcast is uploaded to the FTP server, subscribers may automatically receive the composite file as a web feed. Of course, as noted above, those skilled in the art will also appreciate that the podcast may be transferred to other portable media, such as CD or flash drive, for publication, or may be stored in the database of media events.

Figure 15:
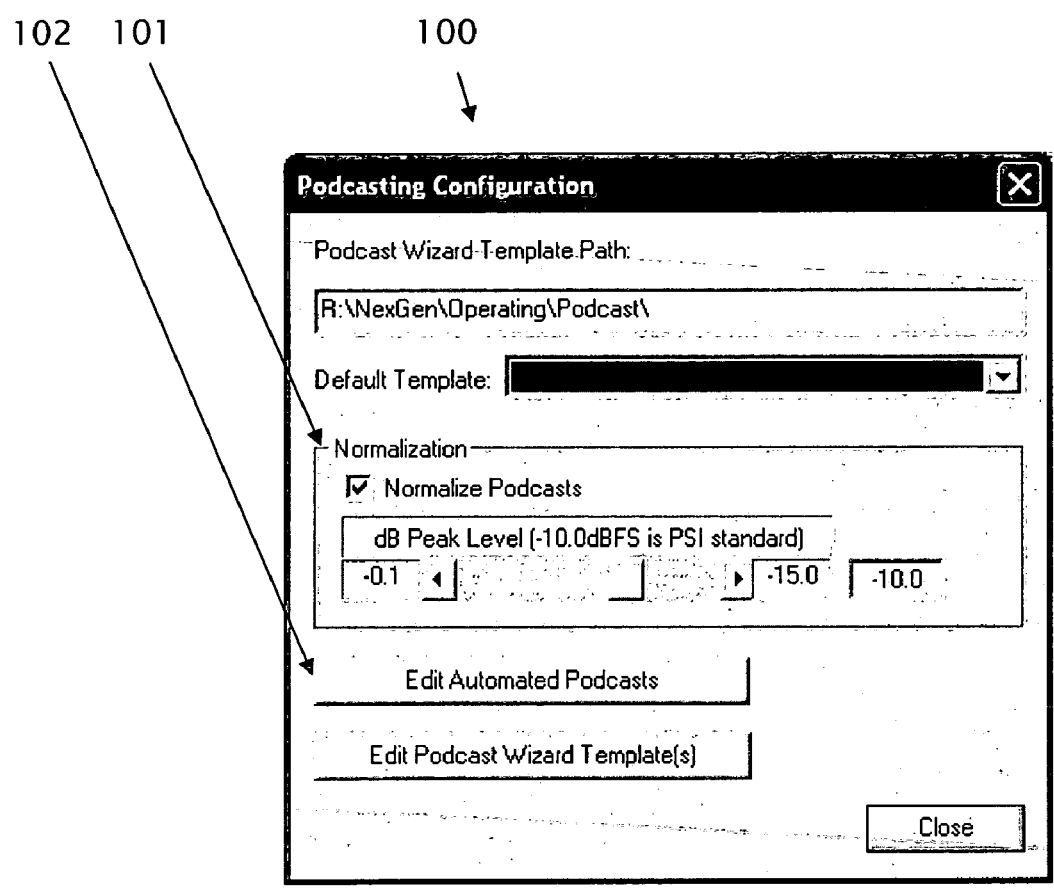
FIG. 15 depicts one embodiment of an interface for podcast configuration that may be provided by the exemplary broadcast automation software.
Figure 16:
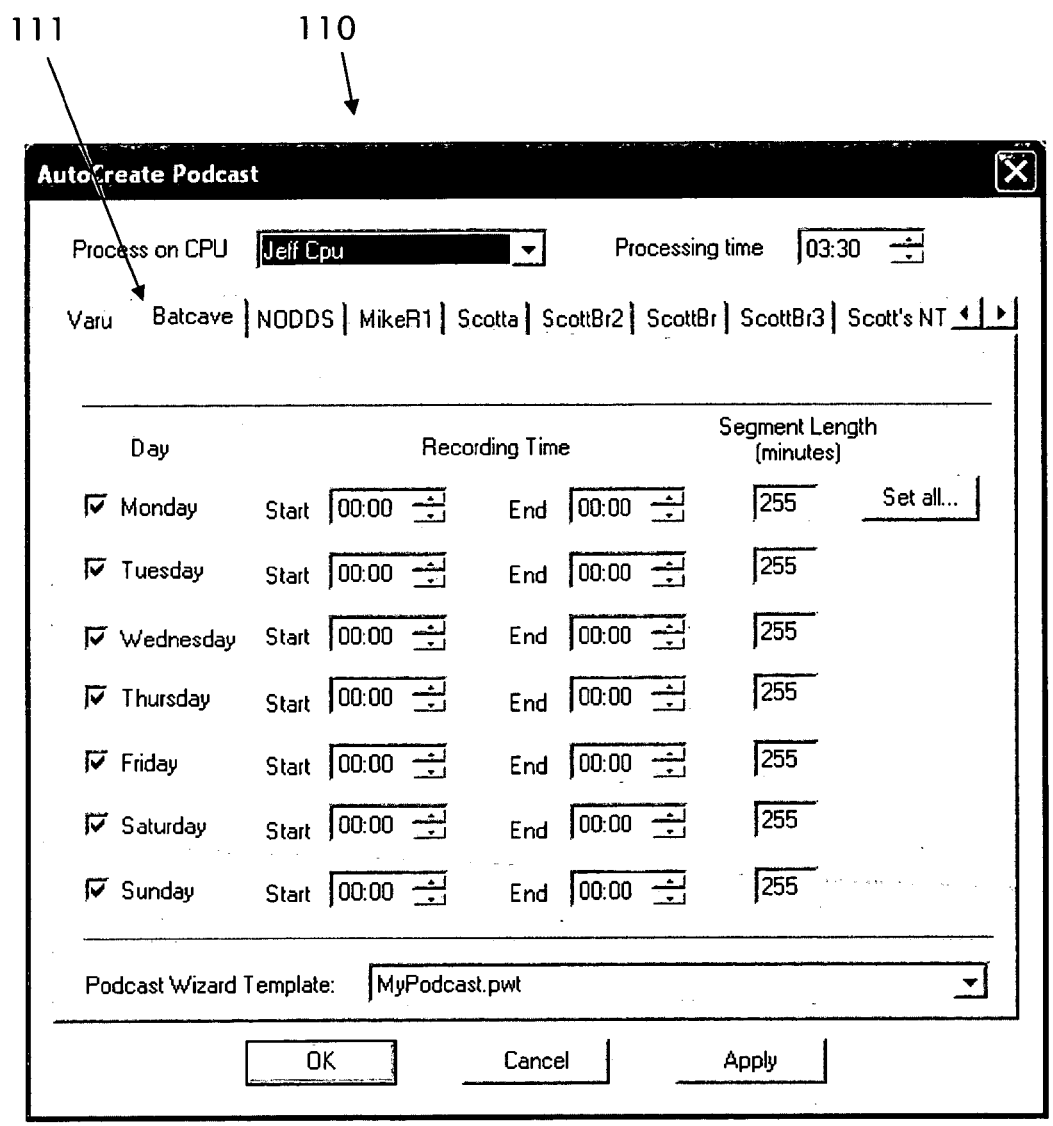
FIG. 16 depicts one embodiment of an interface for automatic podcast creation scheduling that may be provided by the exemplary broadcast automation software.

Those skilled in the art may appreciate that broadcast automation software may provide a way to configure podcasting options in advance of creating a podcast. For example, as seen in the embodiment of FIG. 15, the broadcast automation software may provide an interface 100 to allow a broadcaster the option of normalizing 101 a podcast so that the volume level of each media event is made substantially the same as the volume level of the other media events comprising the podcast. Also as seen in the embodiment of FIG. 15, the broadcast automation software may provide an automatic scheduling interface button 102 to allow for pre-scheduled creation of podcasts. In the embodiment of FIG. 16, for example, an interface 110 may be provided to allow a given station 111 to schedule the date, time and length of a podcast. Using this embodiment, a broadcaster may avoid the need to select media events from a playlist or event log each time a podcast is made.

Figure 17:
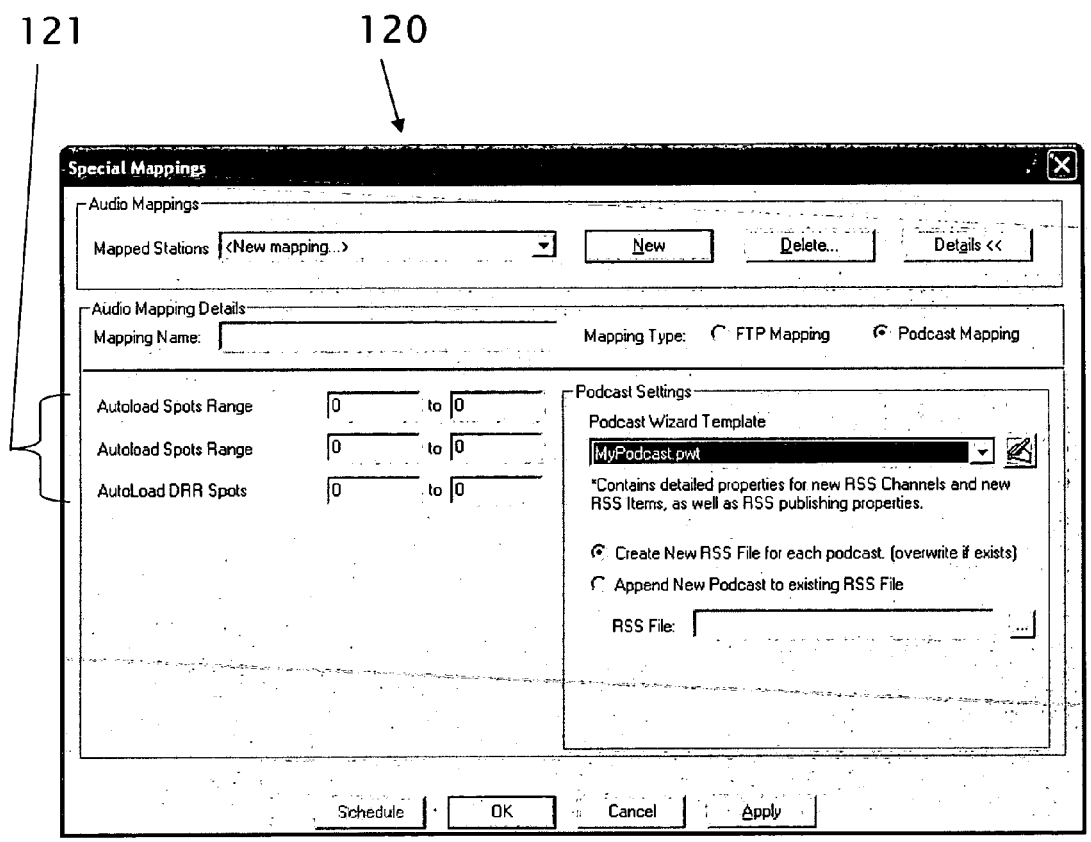
FIG. 17 depicts one embodiment of an interface for network mapping that may be provided by the exemplary broadcast automation software.

Likewise, broadcast automation software may provide an interface 120 for broadcasters to map the transfer of podcasts upon creation, as seen in the embodiment of FIG. 17. For example, a broadcasting organization may comprise several broadcast stations connected through a wide area network, but only one broadcast automation scheduler. In that event, the broadcast scheduler may define, or map, a remote broadcast station 121 to which a podcast, once created, may be transferred or "WANcast." For example, a broadcaster may record a live radio interview, and, upon recordation, automatically distribute that recorded interview as an audio file or podcast to a remote broadcast station or FTP server for use.

Thus, the podcast automation process may include selection of media events from a playlist or event log, or automatic scheduling of podcast creation, or automatic distribution across a wide area network.

Those skilled in the art will appreciate that content assembly may be based on an event log or a playlist or a combination of the two, or some similar compilation of media events. Also, the content assembly or podcast of this embodiment may be based on a playlist/log of media events yet to be played, or on a playlist/log of media events that have already been broadcast, or some combination of the two. For example, a podcast may be created from an event log of a radio program generated prior to real-time broadcast of the program. As used in the claims, the term "automation playlist" broadly covers both playlist and event log. Those skilled in the art will also appreciate that an event log or playlist may, for example, define playback in absolute time, in which playback of a media event begins based upon an exact time measured from a defined starting point, such as a particular clock time or at the beginning of the event log. Likewise, those skilled in the art will appreciate that event log and playlist playback may be defined in transitional time. Transitional time playback, generally means that the media events, play back as they relate to each other. Using a transitional time method, a user may set a cross fade start point for the media event, and when the media event is played, the next media event will begin playing when the cross fade point is reached. A transitional time playback method may present more of a dynamic playback approach.

Those skilled in the art will also appreciate that the process described herein may be provided in a standalone software application usable not only with the broadcast automation software, but also with music-mixing software applications such as Adobe Audition, DigiDesign ProTools and Apple's Garageband. Such content assembly software may be distributed, for example, on CD or via Internet download. Alternatively, the content assembly software may be provided as an interactive web-based application.

For example, the podcast automation process may be provided as a standalone software application that may be used with other broadcast automation software. For example, a playlist transition editor may be combined with the podcast automation functionality embodied in the "Podcast Wizard" interface of FIG. 9 et seq.

Figure 18:
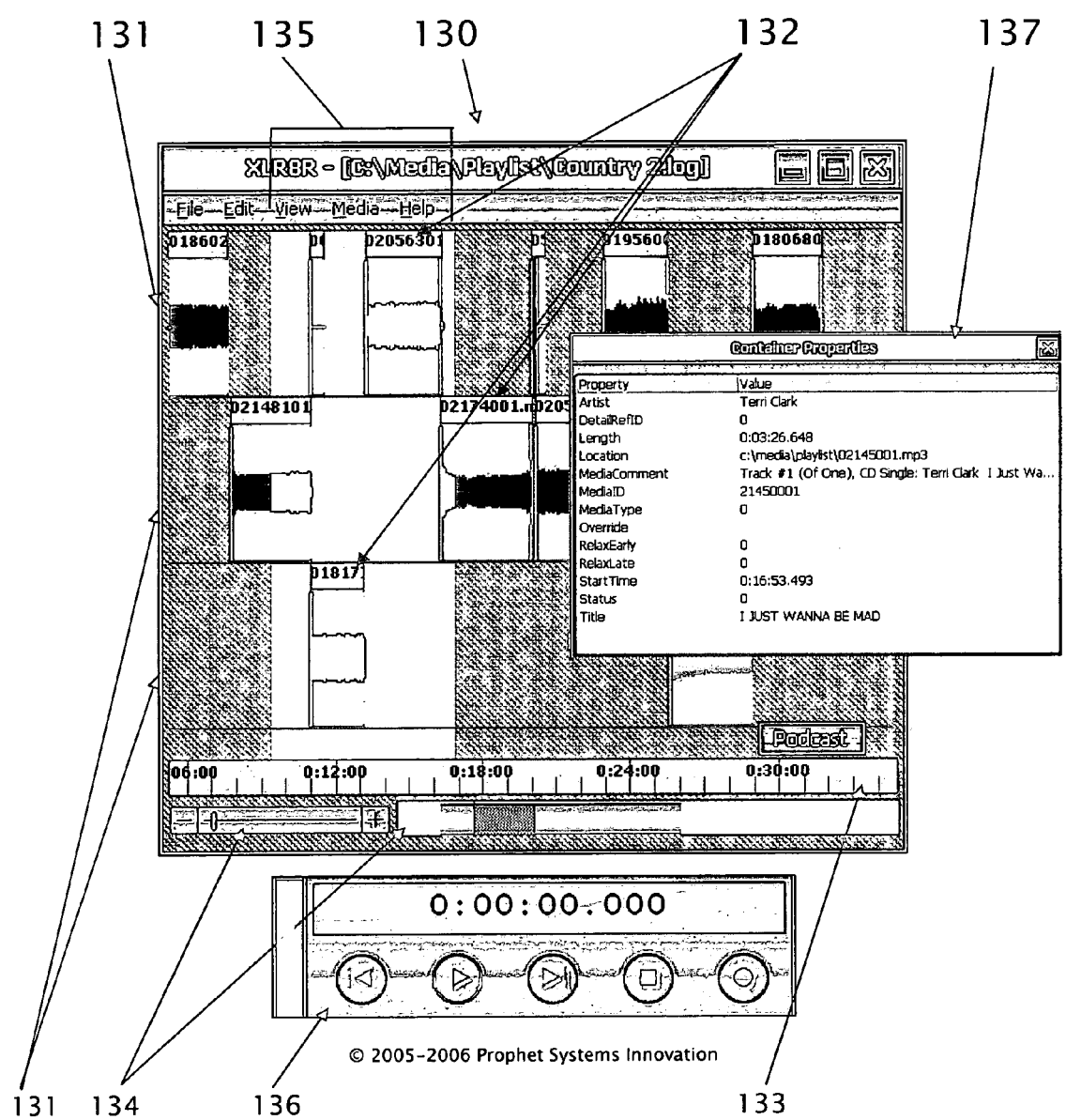
FIG. 18 depicts one embodiment of an editor for editing the relationship between the media events of a playlist.

FIG. 18 depicts one embodiment of such a playlist transition editor 130 that may accept playlists generated by broadcast automation software from a variety of vendors, as well as playlists generated by other music mixing software. Such a playlist transition editor may receive a playlist and edit the relationship between media events of that playlist. In the embodiment of FIG. 18, each track 131 may contain one or more media event containers 132. A user may arrange the containers and define the desired transition between media events. A time scale 133 running below the tracks allows the user to view the time position of each media element, and slider bars 134 allow the user to determine the portion of the timeline at which the media events are to be played. A user may use a cursor to select portions 135 of the media events across various tracks, and use the playback controls 136 to review the media events.

Figure 19:
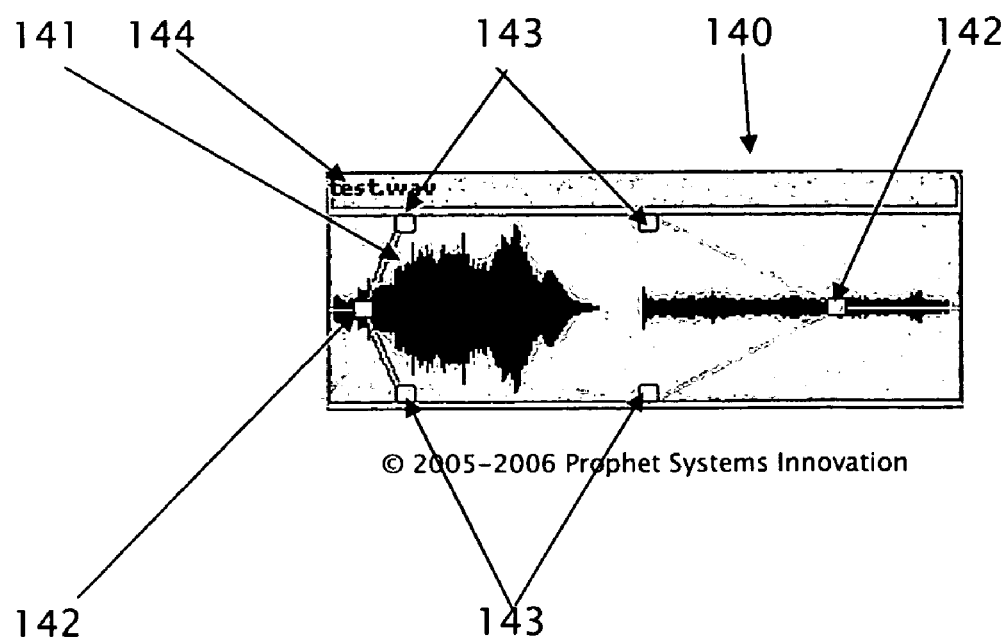
FIG. 19 depicts a detailed view of a container of the editor of FIG. 18.

FIG. 19 depicts an exemplary container 140 from the playlist transition editor 130 of FIG. 18. As seen in FIG. 19, the container 140 depicts the waveform 141 of the media event, and provides "handles" that may be easily manipulated by a user to define the transition between media elements. The middle handle 142 allows a user to set the transition point within a media event, and the outer handles 143 allow a user to define the transition. For example, the outer handles 143 may be dragged to define the time over which fading may occur. Also as seen in FIG. 19, each container 146 provides the name 144 of the media event represented in the container 146. Referring again to FIG. 18, a user may review and edit container properties 137. Also, using various drop-down menus provided in this embodiment (not shown), a user may create a media event for a container 132, cut content, copy and paste content, and delete content using the transition editor 130 in a manner known to those skilled in the art.

Although the foregoing specific details describe certain embodiments of this invention, persons having ordinary skill in the art will recognize that various changes may be made in the details of this invention without departing from the spirit and scope of the invention as defined in the appended claims. Therefore, it should be understood that this invention is not to be limited to the specific details shown and described herein.

The invention claimed is:

1. A method comprising:
generating an event log to be used to generate a single playable composite media event file, the event log including titles of at least two media events, each of the titles associated with broadcaster-defined metadata including media event relationship rules;
scheduling the generation and publication of the single playable composite media event file, wherein said scheduling includes scheduling a scheduled date and time at which the single playable composite media event file is to be generated, and a length of the single playable composite media event file;
upon receipt of notification that the scheduled date and time has been reached, and without user intervention or instruction, generating the single playable composite media event file using the event log and the broadcaster-defined metadata associated with the titles in the event log by:
selecting the at least two media events on the event log from a database,
appending one of the two media events to another of the two media events to generate appended media events, and
modifying the appended media events in accordance with the broadcaster-defined metadata associated with the titles in the event log;
without user intervention or instruction, preparing the single playable composite media event file to be transmitted over a network; and
without user intervention or instruction, publishing the single playable composite media event file.

2. An apparatus for content assembly, said apparatus comprising:
a database containing a plurality of media events;
a memory including computer readable instructions for execution by a processor;
a processor in communication with said database, wherein the processor executes the computer readable instructions to:
generate an event log to be used to generate a single playable composite media event file,
the event log including titles of at least two media events, each of the titles associated with broadcaster-defined metadata including media event relationship rules;
schedule the generation and publication of the single playable composite media event file, wherein said scheduling includes determining a scheduled date and time at which the single playable composite media event file is to be generated, and a length of the single playable composite media event file;
upon receipt of notification that the scheduled date and time has been reached, and without user intervention or instruction, generate the single playable composite media event file using the event log and the broadcaster-defined metadata associated with the titles in the event log by:
  select the at least two media events on the event log from at least one database, appending one of the two media events to another of the two media events to generate appended media events, and
  modifying the appended media events in accordance with the broadcaster-defined metadata associated with the titles in the event log;
without user intervention or instruction, preparing the single playable composite media event file to be transmitted over a network; and
without user intervention or instruction, publish the single playable composite media event file.

3. The method of claim 1 further comprising converting said at least two media events to a common file format.

4. The method of claim 1 wherein said publishing publishes said playable composite media event as a podcast.

5. The method of claim 1 further comprising decompressing said at least two media events.

6. The method of claim 1 further comprising compressing said single playable composite media event file.

7. The method of claim 1 further comprising creating additional metadata associated with the single playable composite media event file.

8. The apparatus of claim 2, wherein the processor further executes computer readable instructions to convert the at least two media events to a common file format.

9. The apparatus of claim 2, wherein the processor further executes computer readable instructions to publish the single playable composite media event file as a podcast.

10. The apparatus of claim 2, wherein the processor further executes computer readable instructions to decompress said at least two media events.

11. The apparatus of claim 2, wherein the processor further executes computer readable instructions to compress said single playable composite media event file.

12. The apparatus of claim 2, wherein the processor further executes computer readable instructions to create additional metadata associated with the single playable composite media event file.

13. A method for generating a podcast, the method comprising:
  generating an event log to be used to generate a podcast, the event log including titles of at least two audio files, each of the titles associated with broadcaster-defined metadata, the broadcaster-defined metadata including audio file relationship rules;
  scheduling the generation and publication of the podcast wherein said scheduling includes scheduling a scheduled date and time at which the podcast is to be generated, and a length of the podcast;
  upon receipt of notification that the scheduled date and time has been reached, and without user intervention or instruction, generating the podcast using the event log and the broadcaster-defined metadata and audio file relationship rules associated with the titles in the event log by:
    selecting the at least two audio files on the event log from a database,
    appending one of the at least two audio files to another of the at least two audio files to generate appended audio files, and
    modifying the appended audio files in accordance with the broadcaster-defined metadata associated with the titles in the event log;
  without user intervention or instruction, preparing the podcast to be transmitted over a network; and
  without user intervention or instruction, publishing the podcast.

14. The method of claim 13 further comprising converting said at least two audio files to a common file format.

15. The method of claim 13 further comprising decompressing said at least two audio files.

16. The method of claim 13 further comprising compressing said podcast.

17. The method of claim 13 further comprising creating additional metadata associated with the podcast.

* * * * *